(12) United States Patent
Srodzinski

(10) Patent No.: US 6,417,723 B1
(45) Date of Patent: Jul. 9, 2002

(54) METHOD AND APPARATUS FOR GENERATING LOW-NOISE CURRENT FOR MR HEADS

(75) Inventor: David Nicholas Srodzinski, Edinburgh (GB)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/316,685

(22) Filed: May 21, 1999

Related U.S. Application Data
(60) Provisional application No. 60/086,481, filed on May 22, 1998.

(51) Int. Cl.[7] .............................. G05F 1/10; G05F 3/02
(52) U.S. Cl. ..................... 327/538; 327/541; 327/543; 327/427
(58) Field of Search ................................ 327/436, 538, 327/541, 543, 427; 323/312, 315

(56) References Cited

U.S. PATENT DOCUMENTS

| | | | |
|---|---|---|---|
| 5,194,765 A | * 3/1993 | Dunlop et al. | 307/443 |
| 5,233,637 A | 8/1993 | Koerner et al. | 377/42 |
| 5,461,517 A | 10/1995 | Suda et al. | 360/53 |
| 5,581,209 A | * 12/1996 | McClure | 327/538 |
| 5,629,644 A | * 5/1997 | Chevallier | 327/393 |
| 5,831,472 A | * 11/1998 | Wang et al. | 327/543 |
| 5,834,952 A | * 11/1998 | Ngo | 327/54 |
| 6,154,411 A | * 11/2000 | Morishita | 365/226 |

OTHER PUBLICATIONS

Baker, R.J., et al., In: CMOS, Circuit Design, Layout, and Simulation, pp. 141–148, 224–230, 427–488 (1998).

* cited by examiner

Primary Examiner—Terry D. Cunningham
Assistant Examiner—Long Nguyen

(57) ABSTRACT

A method and apparatus for generating low-noise current for a disc-drive head, and in one embodiment, for a magneto-resistive head. In one embodiment, an automatic-adjustment circuit selectively disables selected pairs of current-mirror transistors to achieve a desired minimum effective width-to-length ratio of a field-effect transistor current mirror, in order to reduce device noise. In one embodiment, the current mirror provides a constant current to a magneto-resistive head in a magnetic disc drive.

20 Claims, 9 Drawing Sheets

METHOD AND APPARATUS FOR GENERATING LOW-NOISE CURRENT FOR MR HEADS

RELATED APPLICATIONS

This application claims the benefit under 35 U.S.C. 119(e) of U.S. Provisional Application Ser. No. 60/086,481 filed May 22, 1998.

FIELD OF THE INVENTION

The present invention relates to the field of mass-storage devices. More particularly, this invention relates to a method and circuit for generating low-noise current for magneto-resistive heads.

BACKGROUND OF THE INVENTION

One key component of any computer system is a device to store data. Computer systems have many different devices where data can be stored. One common place for storing massive amounts of data in a computer system is on a disc drive. The most basic parts of a disc drive are a disc that is rotated, an actuator that moves a transducer to various locations over the disc, and circuitry that is used to write and/or read data to and from the disc. The disc drive also includes circuitry for encoding data so that it can be successfully retrieved from and written to the disc surface. A microprocessor controls most of the operations of the disc drive, in addition to passing the data back to the requesting computer and taking data from a requesting computer for storing to the disc.

The disc drive includes a transducer head for writing data onto circular or spiral tracks in a magnetic layer the disc surfaces and for reading the data from the magnetic layer. In some drives, the transducer includes an electrically driven coil (or "write head") that provides a magnetic field for writing data, and a magneto-resistive (MR) element (or "read head") that detects changes in the magnetic field along the tracks for reading data.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc-drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

Typically, a current-source circuit is used to provide a constant bias current for the MR element in the read head. Changes in the resistance of the MR element result in a change in voltage across the MR element, and a voltage-detector circuit is used to detect those changes. Any noise in the current source will result in noise in the voltage across the MR element, and thus in the detected voltage.

There is, therefore, a need for a method and circuit for generating low-noise current for transducers, and in particular for magneto-resistive sensing elements.

SUMMARY OF THE INVENTION

A method and apparatus is described for generating low-noise current for a disc-drive head, and in one embodiment, for a magneto-resistive head.

One embodiment provides a current-generating circuit, a disc-drive system using the circuit, and a related method. The system includes a rotating disc, a transducer having a read head positioned to read data from the disc, and the current-generator circuit. The current-generator circuit is operatively coupled to the read head. The current-generator circuit includes a field-effect-transistor current-mirror circuit and an automatic adjustment circuit operatively coupled to the current-mirror circuit to adjust an effective width-to-length ratio of field-effect-transistors of the current-mirror circuit in order to reduce noise. In one embodiment, the adjustment is made automatically until a minimum acceptable voltage is obtained across a current-setting sink circuit.

Another aspect of the present invention provides a current-generator circuit for generating low-noise current for a transducer or other application. This circuit includes a field-effect-transistor current-mirror circuit and an automatic adjustment circuit operatively coupled to the current-mirror circuit that adjusts an effective width-to-length ratio of field-effect-transistors of the current-mirror circuit in order to reduce noise.

Another aspect of the present invention provides a method for reducing device noise in a current mirror circuit. The method includes the steps of (a) providing a plurality of current-mirror pairs of field-effect transistors, and (b) selectively disabling one or more of the pairs of field-effect transistors to adjust a width-to-length ratio and thus to reduce device noise.

Another aspect of the present invention provides a disc drive system that includes a rotating disc, a transducer having a read head positioned to read data from the disc, and a current-generator means for automatically adjusting a width-to-length ratio in order to reduce noise.

Advantageously, the system, circuit, and method described for generating low-noise current for a transducer can be activated as part of the disc-drive power-on sequence (and optionally at other times as well) to automatically adjust the effective width-to-length ratio of a transducer bias current source. In some embodiments, the width-to-length ratio is adjusted by selectively disabling one or more pairs of field-effect-transistors that are wired in parallel as current-mirror current sources, until the smallest width-to-length ratio is achieved that will still maintain at least a minimum desired voltage across a current sink. In some embodiments, the current generated for the transducer is a multiple, such as ten, times the current passed to the current sink.

DESCRIPTION OF THE PREFERRED EMBODIMENT

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

The invention described in this application is useful for all types of disc drives, including hard-disc drives, ZIP drives, floppy-disc drives, and any other type of drives, systems of drives (such as a "redundant array of inexpensive/independent disc drives," or RAID, configuration) or other devices, where data are read using a read head that is biased by a current source.

Figure 1:
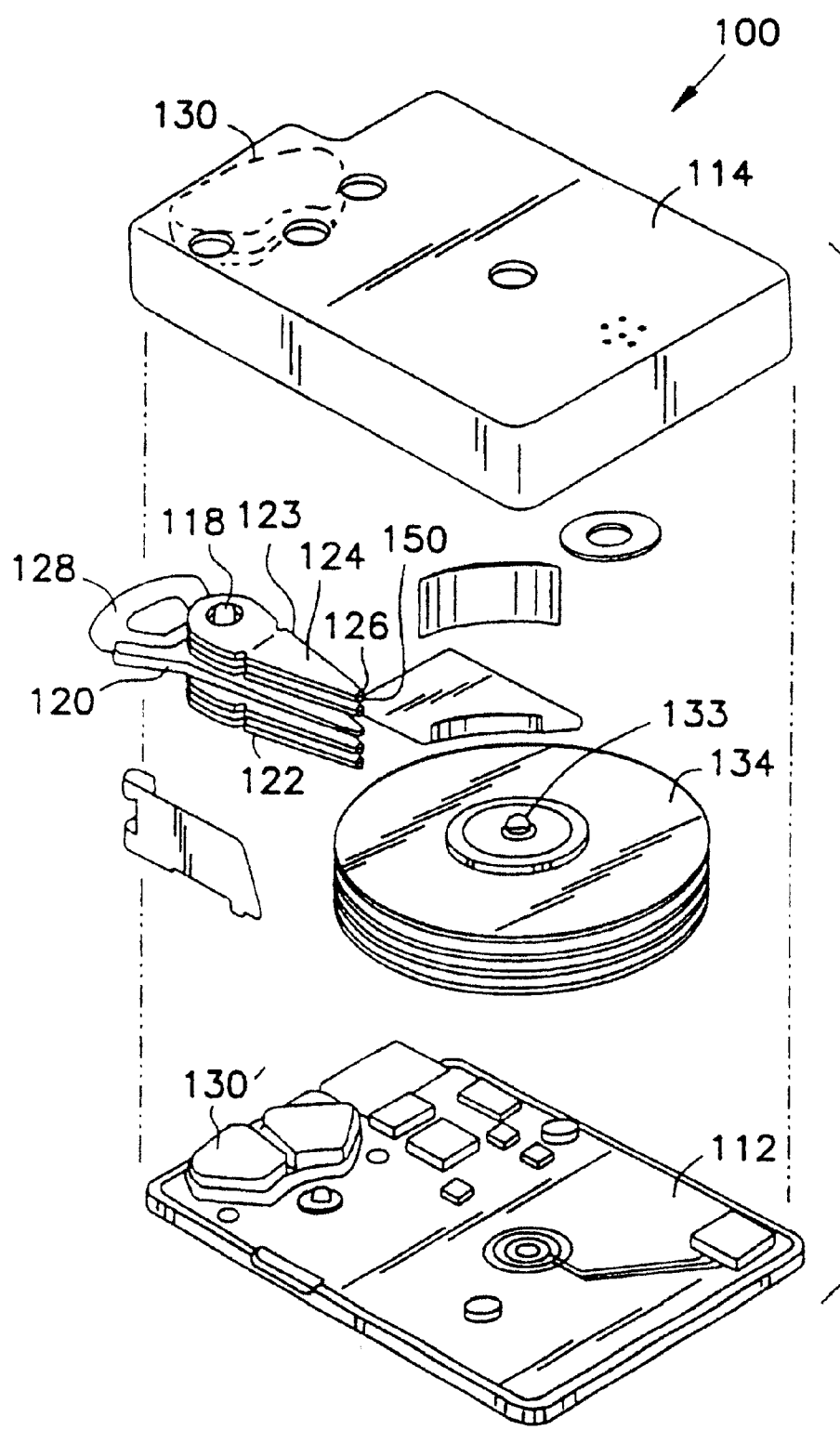
FIG. 1 is an exploded view of a disc drive with a multiple disc stack and a ramp assembly for loading and unloading transducers to and from the surfaces of the discs.

The invention described in this application is useful with many electrical and mechanical configurations of disc drives having either rotary or linear actuation. In addition, the invention is also useful in all types of disc drives including hard disc drives, zip drives, floppy disc drives and any other type of drives where providing a low-noise current source for the transducer may be desirable. FIG. 1 is an exploded view of one embodiment of the present invention, this embodiment showing one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. In some embodiments, transducer 150 includes a electromagnetic coil write head 97 and a magneto-resistive read head 98 (see FIG. 2, below). The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 130'. As shown in FIG. 1, the second magnet 130' is associated with the cover 114. The first and second magnets 130, 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
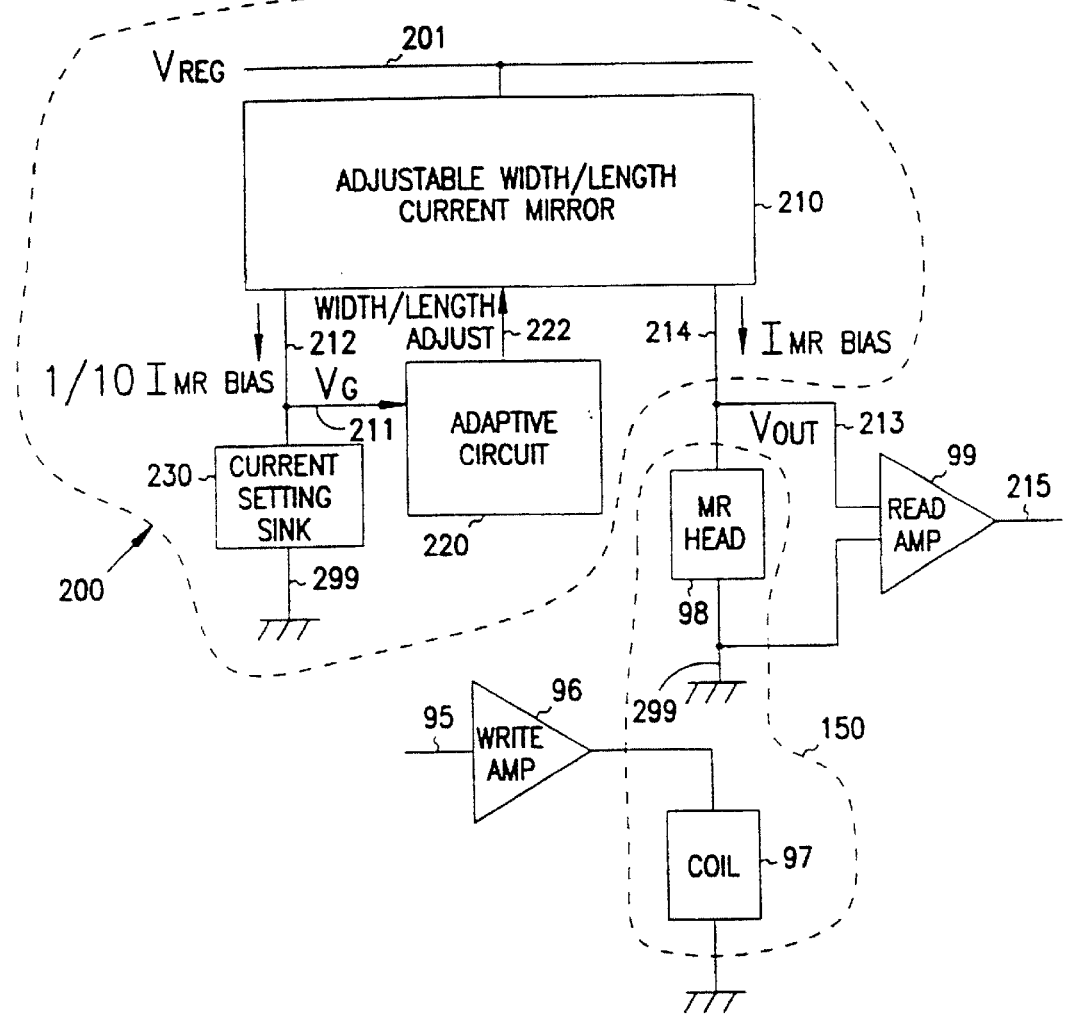
FIG. 2 is a block diagram of a current source 200 incorporating the present invention.

FIG. 2 is a block diagram of a current source 200 incorporating the present invention. In some embodiments, transducer 150 includes a electromagnetic coil write head 97 and a magneto-resistive read head 98 (see FIG. 1). The low-noise current generator 200 is useful for many types of transducers, including magneto-resistive read sensing element (MR head) 98. In the embodiment shown, current generator 200 provides a constant source of current 214 ($I_{MR\ BIAS}$) into MR head 98. During write operations, input signal 95 is conditioned by write amp 96 and drives electromagnetic coil 97 to record the data as variations in magnetic field along a track (circular or spiral) on disc 134. During subsequent read operations, transducer 150 is again passed along the recorded magnetic track, and as variations in the sensed magnetic field cause the resistance of MR head 98 to vary, read amp 99 detects the resulting variations in $V_{OUT}$ and generates output signal 215, used by disc drive 100 to decode or generate the read data.

It is desirable to reduce any noise or other variations in current 214 ($I_{MR\ BIAS}$). One model of the equivalent voltage noise of a field-effect device such as a PMOS (positive-doped metal-oxide semiconductor) transistor is $Vn = \sqrt{(4*K*T*\lambda*Gm)}*R$ volts/$\sqrt{Hz}$; where K=Boltzman's constant, T=temperature in degrees Kelvin, $\lambda$ is a device constant (in some embodiments, this is typically $2/3$), R is the effective resistance load seen by the circuit, i.e., the resistance of the MR head 98), and $Gm = \sqrt{(2*Id*B*W/L)}$ amperes/volt, where Id=operating current of the PMOS device, B=a constant for the technology of the PMOS device, W=effective width of the PMOS device, and L=effective length of the PMOS device (W/L is called the width-to-length ratio). Thus, $$Vn=\text{square root}\{4*K*T*\lambda*\text{square root}(2*Id*B*W/L)\}*R \text{ volts}/\sqrt{Hz}.$$

Since this noise voltage depends on the W/L ratio, the present device operates to minimize the W/L ratio, in order to reduce the voltage noise of the PMOS devices of the current source 200, while still maintaining a sufficient voltage Vg 211 such that the current-setting sink 230 operates properly under normal operating conditions.

It is to be understood that various embodiments of the present invention use one or the other sign for voltages and current direction, and thus "current source" is meant to include current generators for either current direction, and "current sink" is meant to include the opposite current direction.

In FIG. 2, current mirror 210 will provide, onto wire 214, a multiple N of the current drawn on wire 212. In some embodiments, the multiple N is ten, in other embodiments, the multiple N is one, and in yet other embodiments, other multiples are used. Thus, current-setting sink 230 will determine the amount of current through wire 212, and current mirror 210 will provide N times that current through wire 214. Adaptive circuit 220 senses voltage Vg 211 at the node between current mirror 210 and current-setting sink 230, and provides signal 222 to adjust the effective width/length ratio of the devices forming current mirror 210.

In one embodiment, adaptive circuit 220 is reset upon powering up of disc drive 100, senses voltage Vg 211, and operates to successively reduce the W/L ratio of the appropriate devices in current mirror circuit 210.

Figure 3:
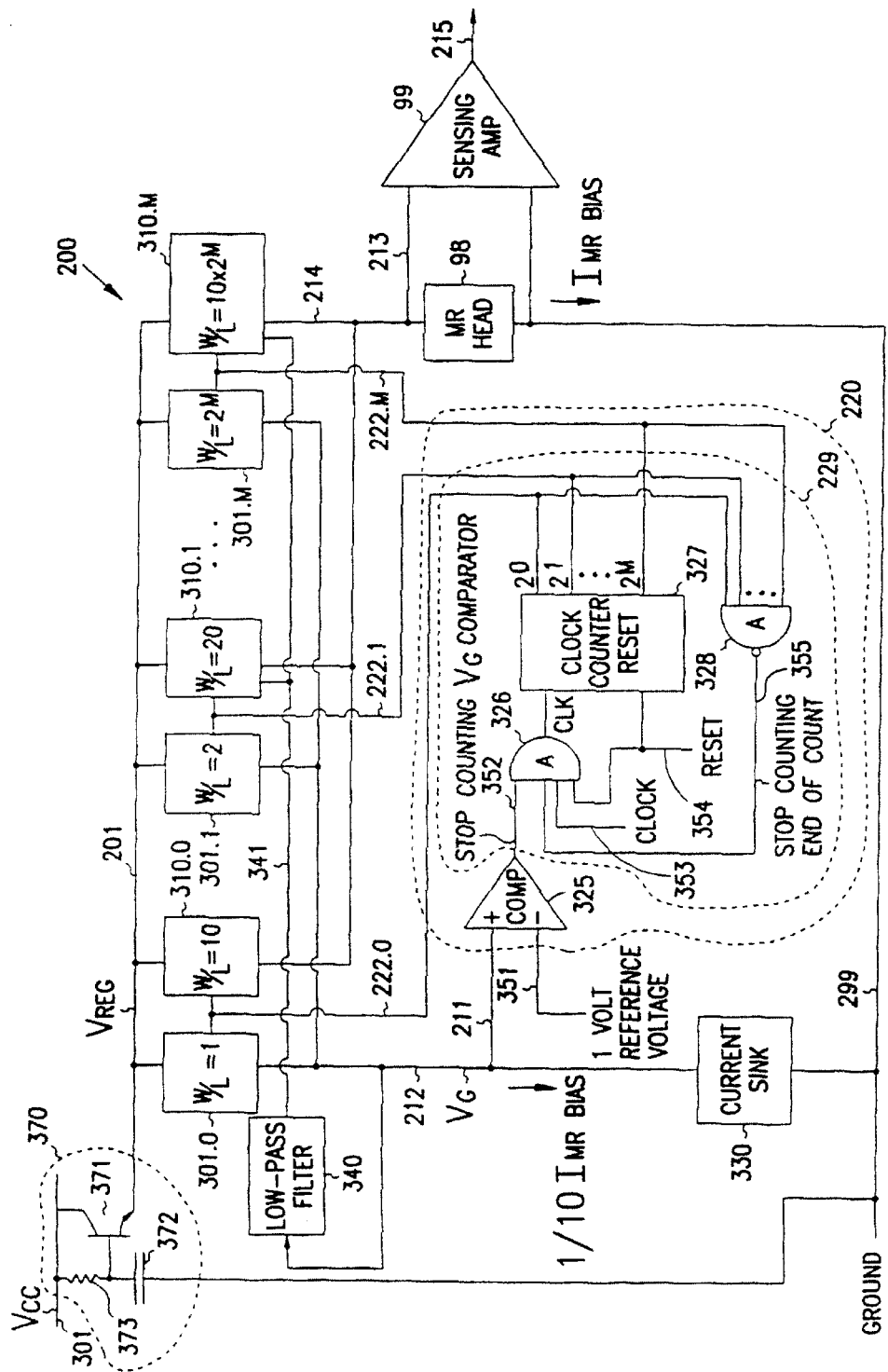
FIG. 3 is a block diagram showing more details of current source 200.

FIG. 3 is a block diagram showing more details of current source 200. In one embodiment, regulator 370 (including bipolar transistor 371, resistor 373, and capacitor 372) operates to generate regulated voltage Vreg 201 from source voltage Vcc 301. Current mirror 210 operates from Vreg 201. In the embodiment shown, a plurality of current-mirror pairs pf transistors (301.0 and 310.0), (301.1 and 310.1), through (301.M and 310.M) are provided, with their respective outputs wired in parallel, as shown in FIG. 3.

In some embodiments, the relative W/L ratios of the individual transistors within a given pair have a ten-to-one ratio (i.e., the W/L ratio of current-setting circuit 301.0 would be X, and the W/L ratio of corresponding current-source circuit 310.0 would be 10X). This provides an output current on wire 214 that is ten times the current on wire 212, thus saving power over an embodiment having a one-to-one ratio of W/L for these transistors.

In some embodiments, selection circuit 229 operates on a binary basis, starting with the highest possible voltage Vg 211, and successively reducing the effective W/L ratio by the smallest step (e.g., with a four-bit counter, and four pairs of current-mirror transistors, the step size is 1/16 of the maximum W/L), thus reducing the voltage Vg 211 until the desired operating voltage is achieved. For example (see FIG. 7 below), in one embodiment, Vg 211 starts at 2.3 volts, and is successively reduced until it just goes below 1.0 volts, thus remaining well above the 0.4 volts at which the current sink 230 may start to fail to operate properly. In some other embodiments, selection circuit 229 operates on a successive approximation basis, with each step subtracting or adding to the effective W/L ratio by steps that are half of the prior step.

In various embodiments, selection circuit 229 is implemented with a counter 327 (e.g., the embodiment shown in FIG. 3), or using a programmed microprocessor, or using other suitable circuitry, as desired.

In some embodiments, the relative W/L ratios of the successive pairs of transistors have a two-to-one ratio over the previous pair (i.e., the W/L ratio of current-setting circuit 301.0 would be X, and the W/L ratio of corresponding current-source circuit 310.0 would be 10X, and the W/L ratio of current-setting circuit 301.1 would be 2X, and the W/L ratio of corresponding current-source circuit 310.1 would be 20X). This provides a binary progression of effective W/L ratios for the various pairs providing output current on wire 214, thus allowing a binary counter, such as counter 327, to fine-tune the effective W/L ratio of the entire current mirror 210. For example, one embodiment uses four pairs of transistors 301–310, and a four-bit counter 327 to provide up to sixteen different effective W/L ratios. In one embodiment, low-pass filter 340 is a simple RC filter coupling the voltage Vg 211 to the gates of each current source circuit 310.0, and 310.1 through 310.M.

Figure 4:
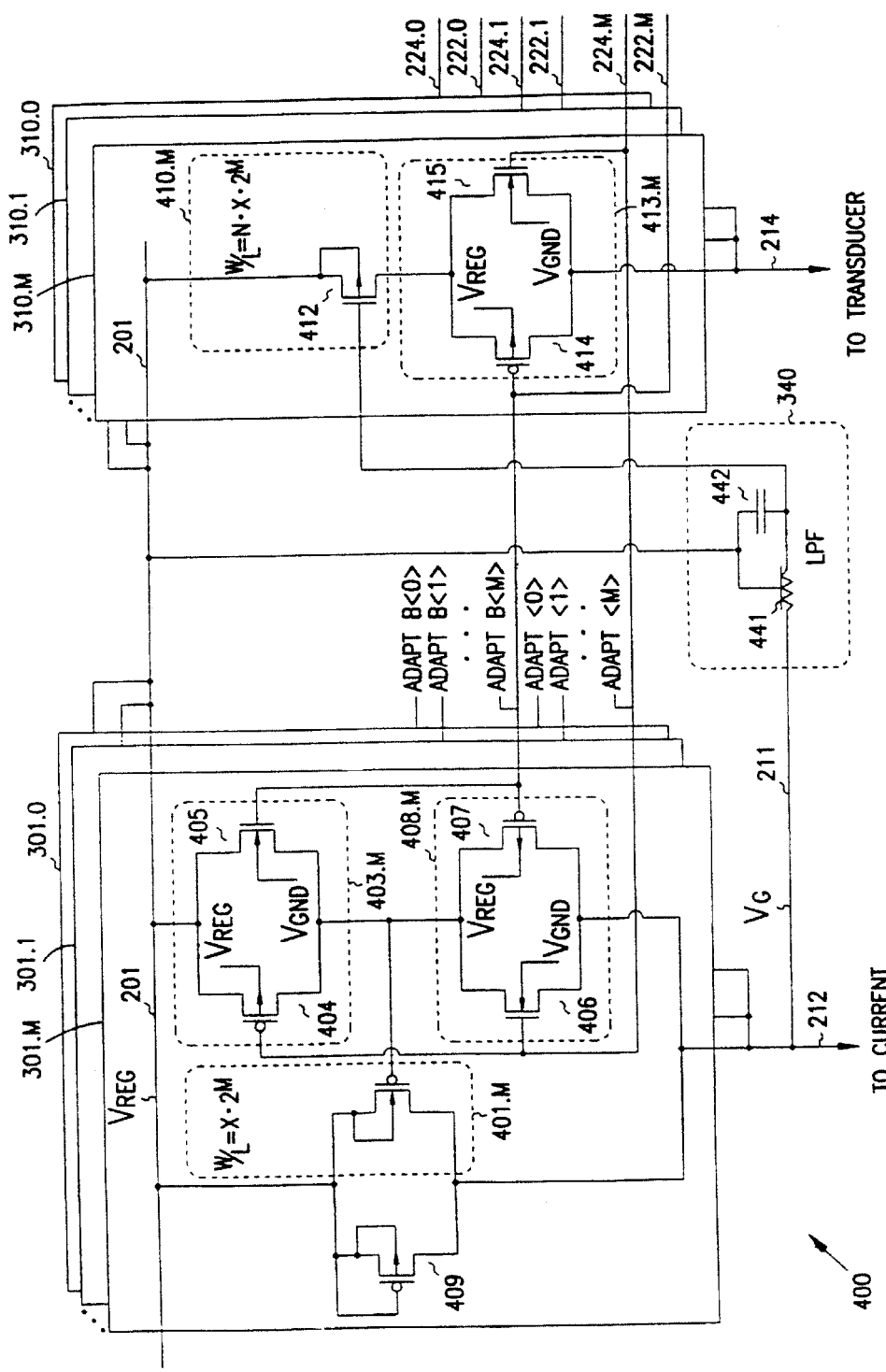
FIG. 4 is a circuit diagram of details of one embodiment of portions of circuit 200.

FIG. 4 is a circuit diagram of details of one embodiment of portions of circuit 200. A plurality M current-setting circuits 301 (labeled 301.0 through 301.M) are provided. Each circuit 301 includes transmission gates (XG) 403 which selectively connects the gate of transistor 402 high (turning it off) and transmission gates (XG) 408 which selectively connects the gate of transistor 402 low (turning it on). Transmission gate (XG) 403 and transmission gate (XG) 408 are wired to opposite phases of control signals ADAPT<m>222 and its inverse ADAPTB<m>224 for the appropriate bit m (wherein m=0, 1, . . . , or M) of counter 327. Transmission gate (XG) 403 includes PMOS transistor 404 and NMOS transistor 405, and transmission gate (XG) 40 8 includes PMOS transistor 40 7 and NMOS transistor 406, wired such that when XG 403 is "on", then XG 408 is "off", and vice versa. Transmission gate (XG) 413 includes PMOS transistor 415 and NMOS transistor 414, wired in series with the corresponding current-source transistor 410.m such that when XG 403 is "on", then XG 413 is "off", and vice versa. Optional transistor 409 is a PMOS device that, in this embodiment, is wired with its gate high (it will normally be off, but provides the ability to be easily rewired—for example by a metal mask change, to have its gate instead connected to the gate of transistor 401, thus changing the multiple N to a smaller value (for example 5-to-1 from 10-to-1). In other embodiments, the gate of transistor 409 is instead wired to the gate of transistor 401, thus doubling the effective W/L ratio for this device if both transistors are otherwise identical. Current-setting transistor 401.m is made with an effective W/L ratio of $X \times 2^m$. In one embodiment, X is 36 micrometers wide/12 micrometers long, wherein m=0, 1, . . . , or M for the various circuits 301. Similarly, each current-source transistor 410.m is made with an effective W/L ratio of $N \times X \times 2^m$. In one embodiment, N is 10, X is 36 micrometers wide/12 micrometers long, wherein m=0, 1, . . . , or M for the various circuits 301. When an XG 403 is on, the corresponding XG 408 is off (thus eliminating the corresponding current-setting transistor 401 from conducting), and the corresponding XG 413 is off (thus eliminating the corresponding current-source transistor 410 from conducting). Low pass filter 340 is formed with series resistor 441 and capacitor 442 wired to Vreg to be a low pass filter between Vg 211 and the gate of each current-source transistor 410. In one embodiment, since the current-setting transistors 401 have a binary progression of W/L ratios (1, 2, . . . $2^M$), and the current-source transistors 410 have a binary progression of W/L ratios ten times as large (10, 20, . . . $10 \times 2^M$), with binary counter 327 disabling respective pairs (401, 410), an overall effective W/L ratio can be adjusted to each of $2^M$ steps (e.g., if M=3, a four bit counter is used, providing 16 steps of W/L ratio).

Figure 5:
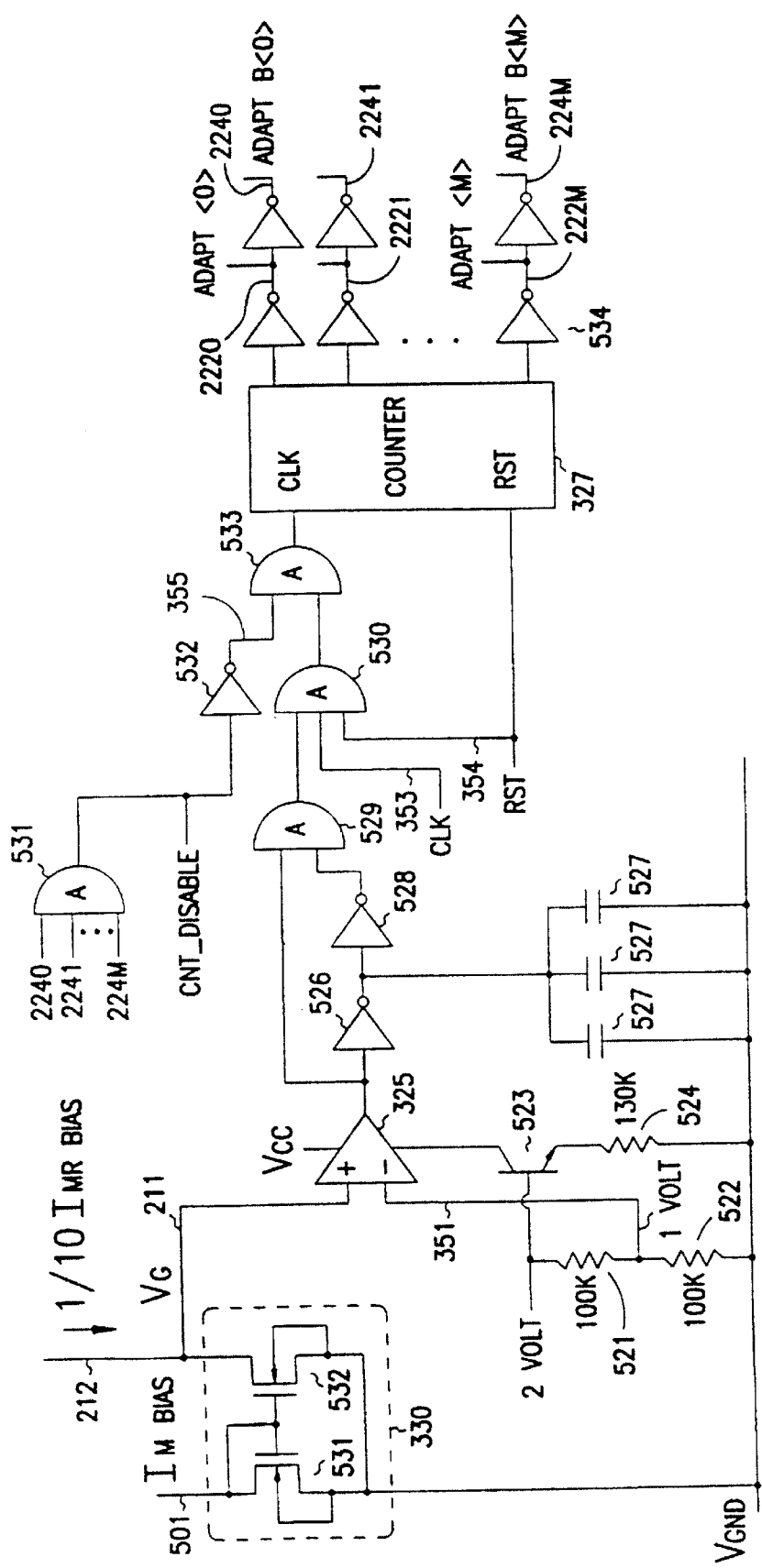
FIG. 5 is a circuit diagram of details of one embodiment of other portions of circuit 200.

FIG. 5 is a circuit diagram of details of one embodiment of other portions of circuit 200. Current setting sink circuit 330 is formed of NMOS transistors 532 and 531, where transistor 531 is wired with its gate high (to its drain), in a current mirror configuration. Both of these transistors as made very wide (e.g., in one embodiment, 2000 micrometers wide), to be good, low-resistance conductors. They will operate with a drain-source voltage down to about 300 to 400 millivolts, however to provide reliable operation, in one embodiment, this voltage (i.e., Vg 211) is adjusted to be about 1.0 volt, by the operation of counter 327. In one embodiment, counter 327 is initially reset, thus turning on all pairs of current-setting transistors 401 (as well as all corresponding current-source transistors 410). This sets the effective W/L ratio to its maximum, and thus the device noise is at its maximum. With the W/L ratio maximum, Vg 211 is at its highest voltage, because the effective resistance of the parallel-wired devices 301 is lowest. Vg 211 is input to comparator 325 and compared to 1-volt reference voltage 511 (which is obtained by dividing a 2-volt reference across two 100K ohm resistors 521 and 522. Bipolar transistor 523 and resistor 524 set the bias current of comparator 325, which is also supplied by Vcc. Capacitors 527 and invertors 526 and 528 along with AND gate 529 provide an initial time delay. AND gate 530 receives the output of AND gate 529, along with clock CLK 353 and reset RST 354. AND gate 533 receives the output of AND gate 530 along with the inverted output of AND gate 531, and in turn drives counter 327 on its CLK input. Counter 327 outputs m bits (0 through M) to respective invertors 534 which provide signals ADAPT<0>2220 through ADAPT<M>222M. Each of these is in turn inverted by respective invertors 535 which provide signals ADAPTB<0>2240 through ADAPTB<M>224M. Signals ADAPTB<0>2240 through ADAPTB<M>224M are all inputs to AND gate 531, and disable the count when it reaches its end. Thus, when Vg 211 is higher than reference voltage 351 (which, in one embodiment, is 1.0 volt), the comparator 325 will enable counter 327 to successively reduce the effective W/L ratio of both the current-setting transistors 401, and the corresponding current-source transistors 410, in pairs in a binary progression. This will reduce the W/L to reduce device voltage noise in the circuit, but will stop the W/L reduction when a desired minimum voltage Vg 211 is reached (in one embodiment, at 1.0 volt).

In some embodiments, the adaptive adjustment is run on every power-up sequence. In some embodiments, reset signal RST 354 is enabled from time to time later to cause the W/L adaptive adjustment to operate again (e.g., in case there was drift, and Vg is perhaps too low).

Figure 6:
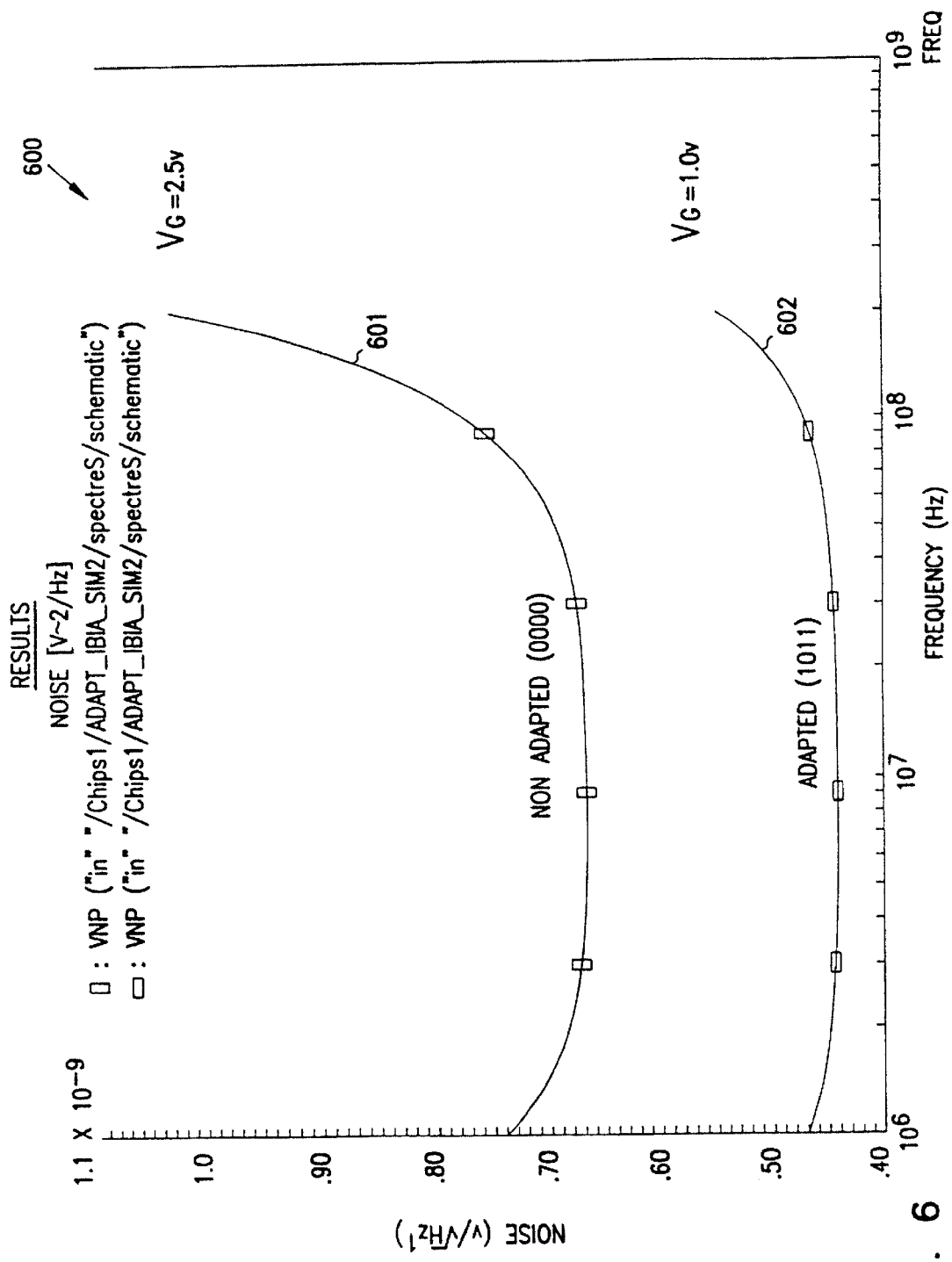
FIG. 6 is a graph of circuit noise with and without adaptive W/L adjustment.

FIG. 6 is a graph of circuit noise with and without adaptive W/L adjustment. Line 601 show the noise between about 1 MHZ and 200 MHZ of about $0.7 \times 10^{-9}$ volts/√Hz for circuit 200 with a typical non-adaptive W/L ratio (i.e., set to its maximum in order that the Vg voltage 211 will always be in a proper operating range). In one embodiment, this corresponds to a counter value of 0000. Line 602 show the noise between about 1 MHZ and 200 MHZ of about $0.45 \times 10^{-9}$ volts/√Hz for circuit 200 with an adaptively obtained W/L ratio (i.e., set to its minimum that still provides the Vg voltage 211 will be in a proper operating range, e.g., 1.0 volt). Thus, a current mirror circuit designed for worst-case (the designer would specify the smallest W/L that, under all circumstances of fabrication variation, temperature, and other parameter variations, would guarantee a sufficient operating voltage 211 for the current sink 230) would have a Vg voltage 211 under many circumstances that would be higher than needed, and thus have a noise level much higher than it needs to be. The adaptive circuit 220 reduces the effective W/L ratio to the smallest value that still obtains a Vg voltage 211 at a desired operating point (e.g., about 1.0 volts), thus yielding a significantly smaller noise value. In one embodiment, this corresponds to a counter value of 1011.

Figure 7:
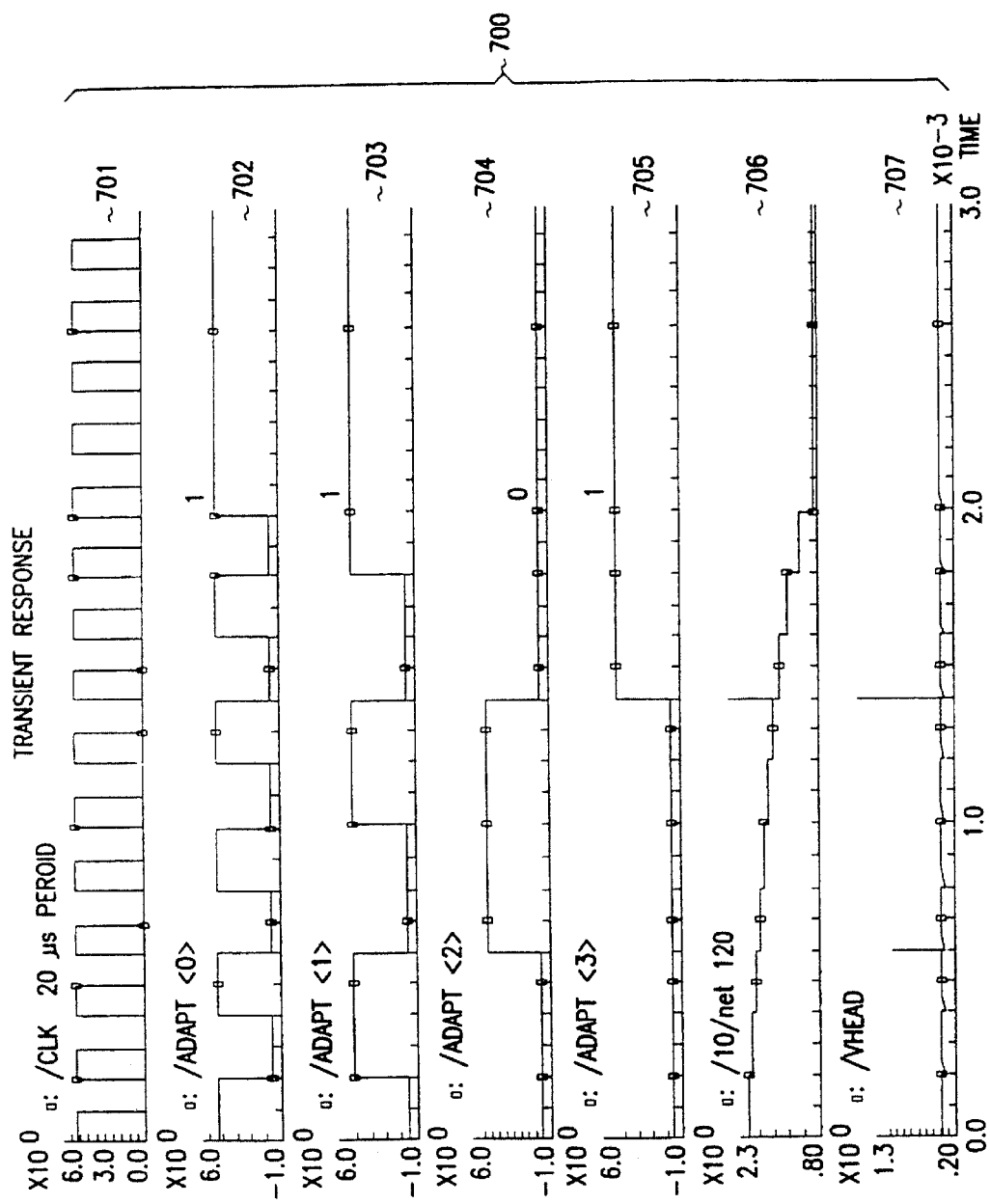
FIG. 7 is a clocking diagram for one embodiment.

FIG. 7 is a clocking diagram for one embodiment. Signal 701 shows the voltage for clock CLK 353. In this embodiment, four counter bits are provided: signal 702 shows the voltage for counter bit ADAPT<0>2220, signal 703 shows the voltage for counter bit ADAPT<1>2221, signal 704 shows the voltage for counter bit ADAPT<2>2222, and signal 705 shows the voltage for counter bit ADAPT<3>2223, (wherein M is 3). Signal 706 shows the voltage for Vg 211, which starts out at about 2.3 volts, and is reduced to about 1 volt. Signal 707 shows the voltage 213 at the MR head 98. These measurements were made for one embodiment at Vcc=5 volts and at a nominal temperature of 40 degrees C.

Advantageously, the system, circuit, and method described for generating low-noise current for a transducer can be activated as part of the disc-drive power-on sequence (and optionally at other times as well) to automatically adjust the effective width-to-length ratio of a transducer bias current source. In some embodiments, the width-to-length ratio is adjusted by selectively disabling one or more pairs of field-effect transistors that are wired in parallel as current-mirror current sources, until the smallest width-to-length ratio is achieved that will still maintain at least a minimum desired voltage across a current sink. In some embodiments, the current generated for the transducer is a multiple, such as ten, times the current passed to the current sink.

Figure 8:
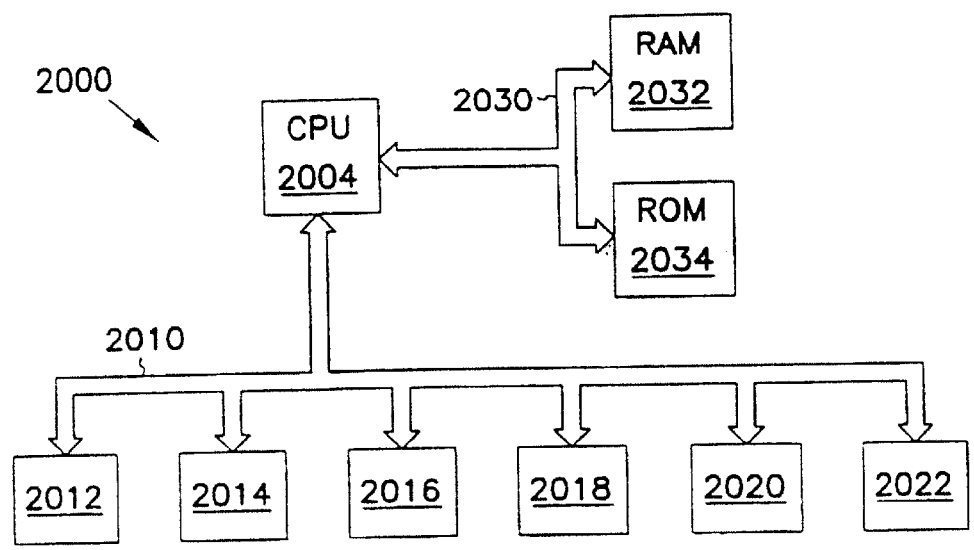
FIG. 8 is a schematic view of a computer system using the present invention.

FIG. 8 is a schematic view of a computer system 2000. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

In other embodiments, the adaptive low-noise current source 200 is used to drive other sensors or transducers, where low-noise operation is desired. In one embodiment, circuit 200 drives a giant-magneto-resistive (GMR) sensor. In one such embodiment, the GMR sensor is used to detect magnetic fields other than in a disc drive. In one embodiment, adaptive low-noise current source 200 is used to drive an optic sensor. In one embodiment, adaptive low-noise current source 200 is used to drive an optical diode sensor. In other embodiments, adaptive low-noise current source 200 is used to drive other devices. In still other embodiments, adaptive low-noise current sources 200 are used in low-noise analog circuits to provide current sources for differential or operational amplifiers (op amps).

Figure 9:
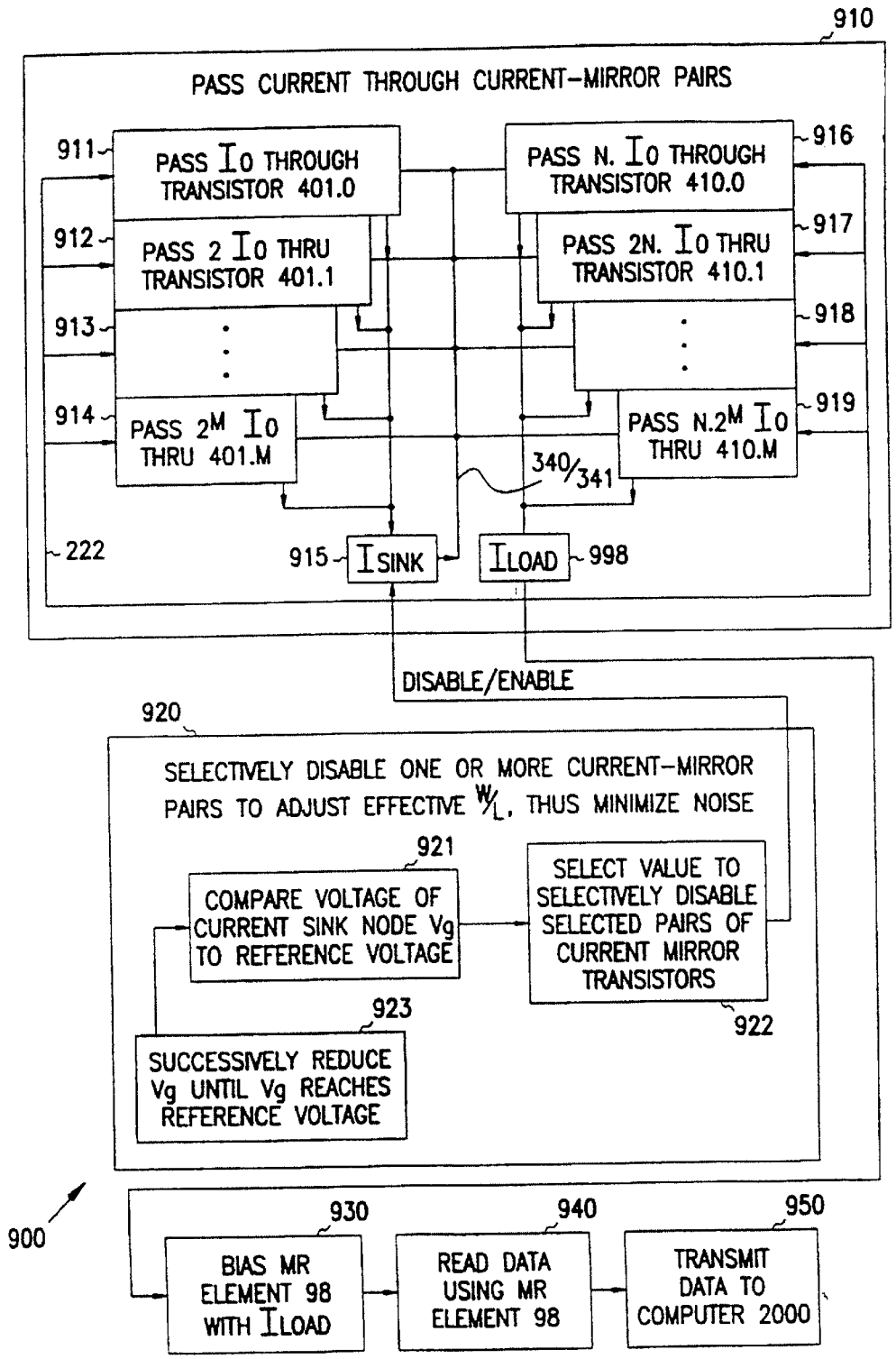
FIG. 9 is flowchart of one embodiment of the present invention.

FIG. 9 is flowchart 900 of one embodiment of the present invention. Block 910 of method 900 for reducing device noise in a current mirror circuit involves passing current through a plurality of current-mirror pairs of field-effect transistors. Block 920 of method 900 involves selectively disabling one or more of the pairs of field-effect transistors to adjust an effective width-to-length ratio and thus to reduce device noise. In one embodiment, the pairs of transistors are substantially similar to pairs 401, 410 of FIG. 4.

In one embodiment of method 900, for each current-mirror pair of field-effect transistors, the passing step 910 further includes passing (step 911) a first amount of current, $I_o$, though a current-setting transistor; and passing (step 916) a second amount of current, $N \times I_o$, through a current-source transistor, wherein $N \times I_o$ is larger by a factor of N than the first amount of current $I_o$. In one embodiment, the current-setting transistor is substantially similar to current-setting transistor 401.0 of FIG. 4, and the current-source transistor is substantially similar to current-source transistor 410.0 of FIG. 4. In some embodiments, steps 913 through 914 (an arbitrary number of steps depending on how fine a granularity of steps are desired) provide additional steps of selectively passing current through current-setting transistors, wherein each step passes twice as much current than the immediately preceding step. Similarly, in some embodiments, steps 918 through 919 (an arbitrary number of steps depending on how fine a granularity of steps are desired) provide additional steps of selectively passing current through current-source transistors, wherein each step passes twice as much current than the immediately preceding step. Step 915 involves generating or sinking an amount of current that controls the current mirror, and thus the amount of current available for step 998 to be provided as $I_{LOAD}$.

In one embodiment of method 900, selectively disabling step 920 includes step 923 of successively reducing a voltage across a current-setting sink circuit until the voltage reaches a predetermined minimum. In one embodiment, the predetermine minimum is a reference voltage of about one volt.

In one embodiment of method 900, providing step 910 further includes step 911 of passing a first amount of current, $I_o$, though a first current-setting transistor 401.0; step 916 of passing a second amount of current, $N \times I_o$, through a first current-source transistor 410.0; step 912 of passing, though a second current-setting transistor 401.1, a third amount of current, $2 \times I_o$, that is substantially twice the first amount of current; and step 917 of passing, through a second current-source transistor 410.1, a fourth amount of current, $2 \times N \times I_o$, that is substantially twice the second amount of current.

In one embodiment of method 900, selectively disabling step 920 further includes step 922 of selecting a value, wherein the value is used to selectively disable selected pairs of the plurality of current-mirror pairs of field-effect transistors; and step 921 of comparing a voltage at a current-sink node to a reference voltage, and based on the comparison, enabling the selecting step 922 until the voltage Vg 211 at the current-sink node is sufficiently close to the reference voltage 351.

Some embodiments of the various embodiments of method 900 just described further include steps of: 930 biasing a magneto-resistive sensing element with current from the plurality of current-mirror pairs of field-effect transistors, 940 reading data from a rotating magnetic disc with the magneto-resistive sensing element, and 950 transmitting the read data to an information-handling system such as computer 2000 of FIG. 8.

Conclusion

Described above is a method and apparatus for generating low-noise current for a disc-drive head 150, and in one embodiment, for a magneto-resistive head 98.

One embodiment provides a disc-drive system 100 having a rotating disc 134, a transducer 150 having a read head 98 positioned to read data from the disc 134, and a current-generator circuit 200. The current-generator circuit 200 is operatively coupled to the read head 98. The current-generator circuit 200 includes a field-effect-transistor current-mirror circuit 210 and an automatic adjustment circuit 220 operatively coupled to the current-mirror circuit 210 to automatically adjust an effective width-to-length ratio of field-effect-transistors of the current-mirror circuit 210 in order to reduce noise.

In one embodiment, the field-effect-transistor current-mirror circuit 210 includes a plurality of current-mirror pairs 401, 410 of field-effect transistors. Each of these pairs 401, 410 of field-effect transistors includes a current-source transistor 410 and a current-setting transistor 401, and the width-to-length ratio of each current-source transistor 410 is larger than the width-to-length ratio of the corresponding current-setting transistor 401 by a factor of N. In some such embodiments, N is about ten, in order to reduce power consumption. In some other such embodiments, N is about five.

In another embodiment, the field-effect-transistor current-mirror circuit 210 includes a plurality of current-mirror pairs 401, 410 of field-effect transistors including a first pair 401.0, 410.0 and a second pair 401.1, 410.1 of field-effect transistors. These first and second pairs follow a binary-weighted width-to-length ratio progression. In one such embodiment, each pair of field-effect transistors includes a current-source transistor 410 and a current-setting transistor 401, and the width-to-length ratio of each current-source transistor 410 is larger than the width-to-length ratio of the corresponding current-setting transistor 401 by a factor of N. In some embodiments, N is about ten. In some such embodiments, N is about five.

In some embodiments, the automatic adjustment circuit 220 includes a counter 327 operatively coupled to selectively disable selected pairs 401, 410 of the plurality of current-mirror pairs of field-effect transistors, and a comparator 325 operatively coupled to compare a voltage 211 at a current-sink node to a reference voltage 351, and operatively coupled to enable clocking of the counter 327 until the voltage 211 at the current-sink node is sufficiently close to the reference voltage 351.

In some embodiments of the system 100, the disc 134 has a magnetic surface and the read head 98 includes a magneto-resistive sensing element that is biased by current supplied by the current-mirror circuit 200.

In some embodiments of the system 100, the automatic adjustment circuit 220 operates to successively reduce a voltage 211 across a current-setting sink circuit 230 until the voltage reaches a predetermined minimum.

In some embodiments, the system 100 further includes a computer system 2000 having a data interface 2010 that is operatively coupled to the transducer 150 to transmit data to and from the disc 134.

Another aspect of the present invention provides a current-generator circuit 200 for generating low-noise current. This circuit 200 includes a field-effect-transistor current-mirror circuit 210 and an automatic adjustment circuit 220 operatively coupled to the current-mirror circuit 210 that automatically adjusts an effective width-to-length ratio of field-effect-transistors of the current-mirror circuit 210 in order to reduce noise.

In some embodiments of the current-generator circuit 200, the field-effect-transistor current-mirror circuit 210 includes a plurality of current-mirror pairs 401, 410 of field-effect transistors. Each of these pairs 401, 410 of field-effect transistors includes a current-source transistor 410 and a current-setting transistor 401, and the width-to-length ratio of each current-source transistor 410 is larger than the width-to-length ratio of the corresponding current-setting transistor 401 by a factor of N. In some such embodiments, N is about ten, in order to reduce power consumption. In some other such embodiments, N is about five.

In some embodiments of the current-generator circuit 200, the field-effect-transistor current-mirror circuit 210 includes a plurality of current-mirror pairs 401, 410 of field-effect transistors including a first pair 401.0, 410.0 and a second pair 401.1, 410.1 of field-effect transistors, and the first pair 401.0, 410.0 and second pair 401.0, 410.1 substantially follow a binary-weighted width-to-length ratio progression.

In some embodiments of the current-generator circuit 200, each pair 401, 410 of field-effect transistors includes a current-source transistor 410 and a current-setting transistor 401, and the width-to-length ratio of each current-source transistor 410 is larger than the width-to-length ratio of the corresponding current-setting transistor 401 by a factor of N. In some such embodiments, N is about ten. In some such embodiments, N is about five.

In some embodiments of the current-generator circuit 200, the automatic adjustment circuit 220 operates to successively reduce a voltage 211 across a current-setting sink circuit 230 until the voltage reaches a predetermined minimum.

In some embodiments, the automatic adjustment circuit 220 includes: a selection circuit 229 operatively coupled to selectively disable selected pairs of the plurality of current-mirror pairs of field-effect transistors, and a comparator 325 operatively coupled to compare a voltage at a current-sink node to a reference voltage, and operatively coupled to enable changes of the selection circuit until the voltage at the current-sink node is sufficiently close to the reference voltage. In some embodiments, the selection circuit includes a counter 327.

In some embodiments of the various embodiments of the current-generator circuit 200 described above, the automatic adjustment circuit 220 further includes a selection circuit 229 operatively coupled to selectively disable selected pairs of the plurality of current-mirror pairs of field-effect transistors, and a comparator 325 operatively coupled to compare a voltage 211 at a current-sink node to a reference voltage 351, and operatively coupled to enable changes of the selection circuit 229 until the voltage 211 at the current-sink node is sufficiently close to the reference voltage 351. In some such embodiments, the selection circuit includes a counter.

Another aspect of the present invention provides a method 900 for reducing device noise in a current mirror circuit. The method includes the steps 910 passing current through a plurality of current-mirror pairs of field-effect transistors, and 920 selectively disabling one or more of the pairs of field-effect transistors to adjust an effective width-to-length ratio and thus to reduce device noise.

In some embodiments of the method 900, for each current-mirror pair of field-effect transistors, the passing step 910 further includes steps of 911 passing a first amount of current though a current-setting transistor, and 916 passing a second amount of current through a current-source transistor that is larger by a factor of N than the first amount of current.

In some embodiments of the method, the selectively disabling step 920 includes 923 successively reducing a voltage across a current-setting sink circuit until the voltage reaches a predetermined minimum.

In some embodiments of the method, the providing step 910 further includes steps of 911 passing a first amount of current though a first current-setting transistor, 916 passing a second amount of current through a first current-source transistor, 912 passing, though a second current-setting transistor, a third amount of current that is substantially twice the first amount of current, and 917 passing, through a second current-source transistor, a fourth amount of current that is substantially twice the second amount of current.

In some embodiments of the method, the selectively disabling step 920 further includes steps of 922 selecting a value, wherein the value is used to selectively disable selected pairs of the plurality of current-mirror pairs of field-effect transistors, and 921 comparing a voltage at a current-sink node to a reference voltage, and based on the comparison, enabling the selecting step 922 until the voltage at the current-sink node is sufficiently close to the reference voltage.

In some embodiments of the method, for each current-mirror pair of field-effect transistors, the passing step 910 further includes steps of providing a current-setting transistor 401 having a first width-to-length ratio, and providing a current-source transistor 410 having a second width-to-length ratio that is larger than the first width-to-length ratio of the corresponding current-setting transistor by a factor of N. In some such embodiments, N is about ten, in order to reduce power consumption.

In some embodiments of the methods just described, the passing step 910 further includes steps of: providing first pair 401.0, 410.0 of field-effect transistors, and providing a second pair 401.1, 410.1 of field-effect transistors that has a width-to-length ratio that is substantially twice that of a corresponding ratio of the first pair of field-effect transistors.

In some embodiments of the methods just described, the selectively disabling step 920 further includes steps of 922 selecting a value, wherein the value is used to selectively disable selected pairs of the plurality of current-mirror pairs of field-effect transistors, and 921 comparing a voltage at a current-sink node to a reference voltage, and based on the comparison, enabling the selecting step 922 until the voltage at the current-sink node is sufficiently close to the reference voltage.

Some embodiments of the various embodiments of method 900 just described further include steps of: 930 biasing a magneto-resistive sensing element with current from the plurality of current-mirror pairs of field-effect transistors, 940 reading data from a rotating magnetic disc with the magneto-resistive sensing element, and 950 transmitting the read data to an information-handling system.

In various embodiments, the steps of method 900 are performed in the order described and shown. In other embodiments, other orders are used.

Another aspect of the present invention provides a disc drive system 100 that includes a rotating disc 134, a transducer 150 having a read head 98 positioned to read data from the disc 134, and a current-generator means for automatically adjusting a width-to-length ratio in order to reduce noise.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A current-generator circuit for generating low-noise current, the circuit comprising:
   a field-effect-transistor current-mirror circuit; and
   an automatic adjustment circuit operatively coupled to the current-mirror circuit that automatically adjusts an effective width-to-length ratio of field-effect-transistors of the current-mirror circuit in order to reduce noise.

2. The circuit according to claim 1, wherein the field-effect-transistor current-mirror circuit includes a plurality of current-mirror pairs of field-effect transistors, and wherein each pair of field-effect transistors includes a current-source transistor and a current-setting transistor, and the width-to-length ratio of each current-source transistor is larger than the width-to-length ratio of the corresponding current-setting transistor by a factor of N.

3. The circuit according to claim 2, wherein the automatic adjustment circuit operates to successively reduce a voltage across a current-setting sink circuit until the voltage reaches a predetermined minimum.

4. The circuit according to claim 1, wherein the field-effect-transistor current-mirror circuit includes a plurality of current-mirror pairs of field-effect transistors including a first pair and a second pair of field-effect transistors, and wherein the first and second pair substantially follow a binary-weighted width-to-length ratio progression.

5. The circuit according to claim 1, further wherein the automatic adjustment circuit includes:
   a selection circuit operatively coupled to selectively disable selected pairs of the plurality of current-mirror pairs of field-effect transistors; and
   a comparator operatively coupled to compare a voltage at a current-sink node to a reference voltage, and operatively coupled to enable changes of the selection circuit until the voltage at the current-sink node is sufficiently close to the reference voltage.

6. The circuit according to claim 1, wherein the field-effect-transistor current-mirror circuit includes a plurality of current-mirror pairs of field-effect transistors, each transistor having a first node, a second node, and a gate, and wherein each pair of field-effect transistors includes a current-source transistor and a current-setting transistor, the first node of the current-source transistor coupled to the first node of the current-setting transistor, the gate of the current-source transistor and the gate of the current-setting transistor both connected to the second node of the current-setting transistor and not to the second node of the current-source transistor, and the width-to-length ratio of each current-source transistor is larger than the width-to-length ratio of the corresponding current-setting transistor by a factor of N.

7. The circuit according to claim 1, wherein the noise being reduced is equivalent voltage noise of the current mirror circuit current modeled as $$Vn = \text{square root}\{4*K*T*\lambda*\text{square root}(2*Id*B*W/L)\}*R \text{ volts}/\sqrt{Hz},$$

where K=Boltzman's constant, T=temperature in degrees Kelvin, λ is a device constant, R is the effective resistance load seen by the current mirror circuit and where Id=operating current of a field effect transistor of the current mirror circuit, B=a constant for the technology of the field effect transistor, W=effective width of the field effect transistor, and L=effective length of the field effect transistor and W/L is called a width-to-length ratio.

8. A current-generator circuit for generating low-noise current, the circuit comprising:
   a field-effect-transistor current-mirror circuit; and
   means for automatically adjusting an effective width-to-length ratio of field-effect-transistors of the current-mirror circuit in order to reduce noise operatively coupled to the current-mirror circuit.

9. An apparatus comprising:
   a current-generator circuit for generating low-noise current, the current-generator circuit further comprising:
     a field-effect-transistor current-mirror circuit that generates an output current; and
     an automatic adjustment circuit operatively coupled to the current-mirror circuit that automatically adjusts an effective width-to-length ratio of field-effect-transistors of the current-mirror circuit in order to reduce noise in the output current.

10. The apparatus of claim 9, further comprising:
    a base;
    a rotating disc;
    a transducer having a read head positioned to read data from the disc, wherein the current-generator circuit is operatively coupled supply current to the read head; and
    a sensing amplifier coupled to amplify a voltage of the transducer.

11. The apparatus of claim 10, wherein the read head includes a giant magneto-resistive element that is biased by current supplied by the current-mirror circuit.

12. The apparatus of claim 10, wherein the field-effect-transistor current-mirror circuit includes a plurality of current-mirror pairs of field-effect transistors, and wherein each pair of field-effect transistors includes a current-source transistor and a current-setting transistor, wherein each current-setting transistor sets an amount of current sourced by a corresponding current source transistor, and the width-to-length ratio of each current-source transistor is larger than the width-to-length ratio of the corresponding current-setting transistor by a factor of N.

13. The apparatus of claim 10, wherein N is about ten.

14. The apparatus of claim 10, wherein the field-effect-transistor current-mirror circuit includes a plurality of current-mirror pairs of field-effect transistors including a first pair and a second pair of field-effect transistors, and wherein the first and second pair substantially follow a binary-weighted width-to-length ratio progression.

15. The apparatus of claim 12, further wherein each pair of field-effect transistors includes a current-source transistor and a current-setting transistor, and the width-to-length ratio of each current-source transistor is larger than the width-to-length ratio of the corresponding current-setting transistor by a factor of N.

16. The apparatus of claim 10, wherein the automatic adjustment circuit operates to successively reduce a voltage across a current-setting sink circuit until the voltage reaches a predetermined minimum.

17. The apparatus of claim 12, further wherein the automatic adjustment circuit includes:

a counter operatively coupled to selectively disable selected pairs of the plurality of current-mirror pairs of field-effect transistors; and a comparator operatively coupled to compare a voltage at a current-sink node to a reference voltage, and operatively coupled to enable clocking of the counter until the voltage at the current-sink node is sufficiently close to the reference voltage.

18. The apparatus of claim 10, wherein:

the disc has a magnetic surface; and the read head includes a magneto-resistive sensing element that is biased by current supplied by the current-mirror circuit.

19. The apparatus of claim 10, further comprising:

a computer system having a data interface that is operatively coupled to the transducer to transmit data to and from the disc.

20. The apparatus of claim 10, wherein the field-effect-transistor current-mirror circuit includes a plurality of current-mirror pairs of field-effect transistors, each transistor having a first node, a second node, and a gate, and wherein each pair of field-effect transistors includes a current-source transistor and a current-setting transistor, the first node of the current-source transistor coupled to the first node of the current-setting transistor, the gate of the current-source transistor and the gate of the current-setting transistor both connected to the second node of the current-setting transistor and not to the second node of the current-source transistor, and the width-to-length ratio of each current-source transistor is larger than the width-to-length ratio of the corresponding current-setting transistor by a factor of N.

* * * * *